(12) United States Patent
Martin

(10) Patent No.: US 7,793,940 B2
(45) Date of Patent: Sep. 14, 2010

(54) MECHANICAL END FACE SEAL WITH ULTRAHARD FACE MATERIAL

(75) Inventor: Kevin Martin, Doylestown, PA (US)

(73) Assignee: SKF USA Inc., Kulpsville, PA (US)

( * ) Notice: Subject to any disclaimer, the term of this patent is extended or adjusted under 35 U.S.C. 154(b) by 93 days.

(21) Appl. No.: 11/383,518

(22) Filed: May 16, 2006

(65) Prior Publication Data
US 2007/0267820 A1 Nov. 22, 2007

(51) Int. Cl.
F16J 15/34 (2006.01)

(52) U.S. Cl. ........................ 277/370; 277/404

(58) Field of Classification Search .......... 277/370, 277/404
See application file for complete search history.

(56) References Cited

U.S. PATENT DOCUMENTS

| | | | |
|---|---|---|---|
| 3,560,003 A * | 2/1971 | Smith, Laurence E. ..... 277/374 |
| 3,578,345 A * | 5/1971 | Copes .................... 277/370 |
| 3,745,623 A | 7/1973 | Wentorf, Jr. et al. |
| 3,767,371 A | 10/1973 | Wentorf, Jr. et al. |
| 3,841,852 A | 10/1974 | Wilder et al. |
| 3,871,840 A | 3/1975 | Wilder et al. |
| 3,913,280 A | 10/1975 | Hall |
| 3,969,451 A | 7/1976 | Floyd et al. |
| 4,311,490 A | 1/1982 | Bovenkerk et al. |
| 4,502,699 A * | 3/1985 | Mukerji ................... 277/398 |
| 4,532,179 A * | 7/1985 | Takami et al. ............. 428/335 |
| 4,951,954 A | 8/1990 | MacNeill |
| 4,960,971 A | 10/1990 | Kawanabe |
| 5,108,813 A | 4/1992 | Noda et al. |
| 5,402,858 A | 4/1995 | Quantz et al. |
| 5,667,356 A | 9/1997 | Whittier et al. |
| 5,827,042 A | 10/1998 | Ramsay |
| 6,010,533 A | 1/2000 | Pope et al. |
| 6,045,029 A * | 4/2000 | Scott ..................... 228/122.1 |
| 6,139,022 A | 10/2000 | Iwashita et al. |
| 6,142,481 A | 11/2000 | Iwashita et al. |
| 6,267,867 B1 * | 7/2001 | Olson .................... 205/640 |
| 6,290,726 B1 | 9/2001 | Pope et al. |
| 6,325,385 B1 | 12/2001 | Iwashita et al. |

(Continued)

FOREIGN PATENT DOCUMENTS

GB 874884 8/1961

(Continued)

OTHER PUBLICATIONS

U.S. Patent and Trademark Office, ISA, International Search Report and Written Opinion of the International Searching Authority, International Application No. PCT/US2007/068368, Nov. 10, 2008.

*Primary Examiner*—Vishal Patel
(74) *Attorney, Agent, or Firm*—Vedder Price P.C.

(57) ABSTRACT

An end face seal having two thin, opposed faces of a composite PDC/tungsten carbide or like material for example of a thickness of from about 2 to 5 mm to about 10 to 15 mm, brazed or adhesively adhered by an epoxy resin to a substrate of tungsten carbide or silicon carbide/nitride formed in a ring shape. Thereafter, the PDC layer is finish lapped to a flatness of about 1 to about 10 helium lightbands, with a rough lapping to 3 or 4 helium lightbands, and a finish lapping of about 1 helium lightband.

17 Claims, 5 Drawing Sheets

U.S. PATENT DOCUMENTS

| | | |
|---|---|---|
| 6,338,906 B1 | 1/2002 | Ritland et al. |
| 6,402,787 B1 | 6/2002 | Pope et al. |
| 6,425,922 B1 | 7/2002 | Pope et al. |
| 6,517,583 B1 | 2/2003 | Pope et al. |
| 6,596,225 B1 | 7/2003 | Pope et al. |
| 6,655,845 B1 | 12/2003 | Pope et al. |
| 6,676,704 B1 | 1/2004 | Pope et al. |
| 6,695,315 B1 * | 2/2004 | Anderberg .................. 277/369 |
| 6,969,071 B2 | 11/2005 | Berard |
| 7,125,019 B2 * | 10/2006 | Anderberg .................. 277/390 |
| 2004/0046322 A1 * | 3/2004 | Berard ....................... 277/370 |
| 2004/0223676 A1 * | 11/2004 | Pope et al. .................. 384/492 |
| 2006/0042789 A1 | 3/2006 | Kubala |

FOREIGN PATENT DOCUMENTS

| | | |
|---|---|---|
| WO | WO03/069197 | 8/2003 |
| WO | WO2004/111504 | 12/2004 |

* cited by examiner

MECHANICAL END FACE SEAL WITH ULTRAHARD FACE MATERIAL

In the oil field industry and others having specialized requirements for seals, there has arisen a serious need for a high speed mechanical end face seal with an extremely durable, very hard end face material. Some seals at the present time use a silicon carbide, tungsten carbide or graphite end face having its faces finish lapped to a flatness of one helium light band.

Such seals are somewhat satisfactory at low speeds, but at the speeds in which downhole and subsea tools and other equipment, such as high speed drill motors, steering tools, downhole pumps and artificial lift systems, are approaching now renders these facing materials unsatisfactory. Thus, for example, at 5,000 rpm and moderate loadings, the silicon carbide seal faces develop thermal cracks quite often. In addition, the end face loading, which under conditions of heavy vibration is required to keep the seal faces together, must be reduced in order to avoid excessive heat generation. Consequently, these limitations have been a major drawback with these end face seals and have limited their use.

Finally, the silicon carbide material is rather brittle and can break under the high shock loads, which are expected to be encountered in any normal downhole operation. Consequently, a seal life of some 300 hours is accepted as the limit of endurance for such seals.

A greatly improved seal would be able to have spring forces for the end face loading increased from perhaps 40 pounds up to about 80 pounds. Such an increase in the force brought to bear on the end face seals would be very valuable, especially during high vibration applications.

According to the invention, polycrystalline diamond compact (PDC) faced mechanical seals are especially valuable when used for high speed applications (5,000 rpm-10,000 rpm) or when reliable extended service life is required.

Due to the low coefficient of friction, the PDC surface of substantial thickness (0.25 mm-5 mm) used on the end face portion of seals would allow much greater spring pressure to be applied to the faces, would resist thermal cracking and would permit the seal to be used under conditions of high vibration. In some cases, a similar material, such as a polycrystalline cubic boron nitride (PCBN) also holds great promise for obtaining similar results. In addition, a PDC surface or similar material applied to the end faces of such seals could be relapped and used again after the initial face had been worn or can no longer maintain vacuum. This would permit the seal to be used over and over again.

It has also been discovered that the use of PDC as an end face surface on seals of the type in question here would become extremely valuable. The PDC has one of the lowest coefficients of friction of any extremely hard material ($\mu$ 0.05). This coefficient of friction translates into much lower operating temperatures at the interface, substantially higher speed capabilities and, importantly, the ability to survive in dry running or other conditions adverse to lubricant for extended intervals. Also, the PDC face can withstand high spring force preloads without damaging overheating.

It has been discovered that commercially available PDC and PCBN disks can be placed on a secondary substrate such as tungsten carbide, silicon carbide/nitride and the like, and these disks can be adhered to the tungsten carbide by several methods, such as brazing, or by use of selected high temperature epoxy resins. The face materials could include PDC, PCBN and natural diamond monocrystalline compact (NDMC). In order to function properly, the seal faces must be lapped or polished to a flatness of 1-10 helium light bands, preferably 1-3 helium light bands. If the PDC layer is made with sufficient thickness, such as about 0.25 mm to 5 mm, it would also be possible to recondition the seal faces by relapping them to maintain the required specification for flatness.

PDC is where micron sized diamond crystals are fused together using extremely high pressure and extreme temperature to form an integral superabrasive layer on the tungsten carbide substrate. PCBN is similarly made using cubic boron nitride crystals. Both PDC and PCBN layers are made up of thousands of crystals and are isotropic, that is, they exhibit uniform properties in all directions. The PDC or PCBN layer has high hardness and low friction, making it ideal for use as a contact surface under the adverse conditions encountered by an end face seal.

A preferred form would include a mounting member of tungsten carbide or silicon carbide/nitride in the form of a ring, having on the end face thereof a PDC layer with tungsten carbide substrate attached using a brazing method or an epoxy resin. The cylinder should have a diameter of about one to four inches or more, for example.

Accordingly, it is an object of the present invention to create a mechanical end face seal having a particular form of polycrystalline diamond compact or cubic boron nitride on both opposing end faces of the seal and to manufacture such a seal in diameters of up to four inches, perhaps five inches in some cases.

Another object is to provide a mechanical end face seal having a PDC layer of as much as one quarter to five millimeters thickness or more.

Another object of the invention is to provide a mechanical end face seal, which can be reused by refinishing it to a flatness of 1 to 10 helium lightbands after it has undergone at least one cycle as a new seal.

Another object is to provide a composite disk or wafer of a PDC/tungsten carbide or PCBN/tungsten carbide or similar material which can be cut by wire electrical discharge machinery (EDM) to a desired right-circular cylindrical or annular ring shape, and then have this composite layer of two and one half to seven millimeters in thickness, for example, bonded or brazed to a tungsten carbide or other substrate using a brazing process or adhesively attached by an epoxy resin adhesive.

Still another object is to use a pair of flat disks or wafer of PDC/tungsten carbide or PDC silicon carbide which can be formed and then each attached by an epoxy or similar resin adhesive to each of the silicon carbide/nitride or tungsten carbide seal face carriers.

Yet another object is to provide an end face seal having two opposed halves in which each half may be roughly polished to a finish of about 10 helium lightbands and can thereafter be final finished to a flatness of 1 to 3 helium lightbands.

SUMMARY OF THE INVENTION

The foregoing objects and other inherent objects are achieved in practice by providing an end face seal having two thin, opposed faces of a composite PDC/tungsten carbide or like material for example of a thickness of from about 2 to 5 mm to about 10 to 15 mm, brazed or adhesively adhered by an epoxy resin to a substrate of tungsten carbide or silicon carbide/nitride formed in a ring shape. Thereafter, the PDC layer is finish lapped to a flatness of about 1 to about 10 helium lightbands, with a rough lapping to 3 or 4 helium lightbands, and a finish lapping of about 1 helium lightband, for example.

The exact manner in which the above and other inherent objects of the invention are achieved in practice will be more clearly apparent when reference is made to the following detailed description of the preferred embodiments of the invention and shown in the accompanying drawings in which like reference numbers indicate corresponding parts throughout.

BRIEF DESCRIPTION OF THE DRAWINGS

FIG. 1A shows diagrammatically a disk of PDC and, therebeneath, a disk of presintered tungsten carbide;

FIG. 1B diagrammatically shows the form of the two separate disks, that are about to be placed together into a composite disk and compressed under an extremely high force of at least 50000 lbs;

FIG. 1C diagrammatically shows the superimposed disks held under extremely high pressure and heated to a temperature of about 2000° F. for example;

FIG. 1D diagrammatically shows the disk thus produced having its center cut out by an EDM wire, also schematically shown, to form a composite PDC/tungsten carbide ring;

FIG. 1E shows the relation of the composite seal ring, a thin strip of brazing material and a tungsten carbide seal carrier in spaced apart relation; and FIG. 1F shows the components in FIG. 1E just before they are placed together prior to brazing;

FIG. 1G shows the components in a "glove box" being induction heated to brazing temperature in an argon gas atmosphere;

DESCRIPTION OF THE PREFERRED EMBODIMENTS OF THE INVENTION

While the invention is capable of being practiced in a number of ways, and the exact sizes and materials from which it is made may be varied somewhat, an example will be given of several methods of making a few forms of the end face seal of the invention.

Figure 1A:
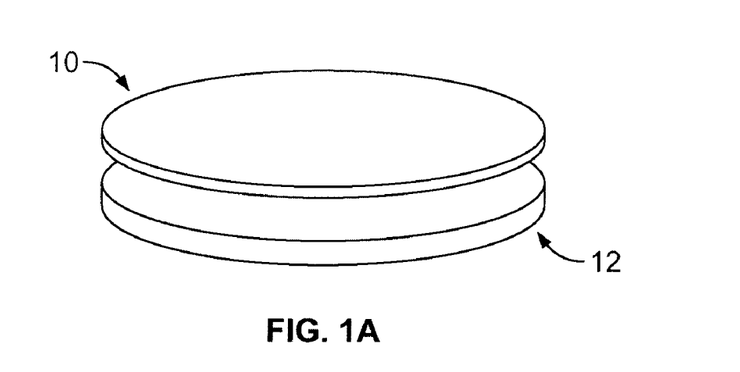
FIGS. 1A thru FIG. 1G are views diagrammatically showing the steps in manufacturing a composite PDC-tungsten carbide seal face ring, carried by a brazed-on tungsten carbide ring carrier.

Referring first to the raw materials used to make the seals of the invention, PDC is manufactured in advanced computer controlled presses capable of exerting extremely high pressure, such as that approaching one million ($1 \times 10^6$) psi, at temperatures above 2000° F. The manufacturing process begins with forming a disk of micron sized diamond crystals generally designated 10 selected for the specific properties needed, such as abrasion resistance, impact strength and low running friction.

Figure 1B:
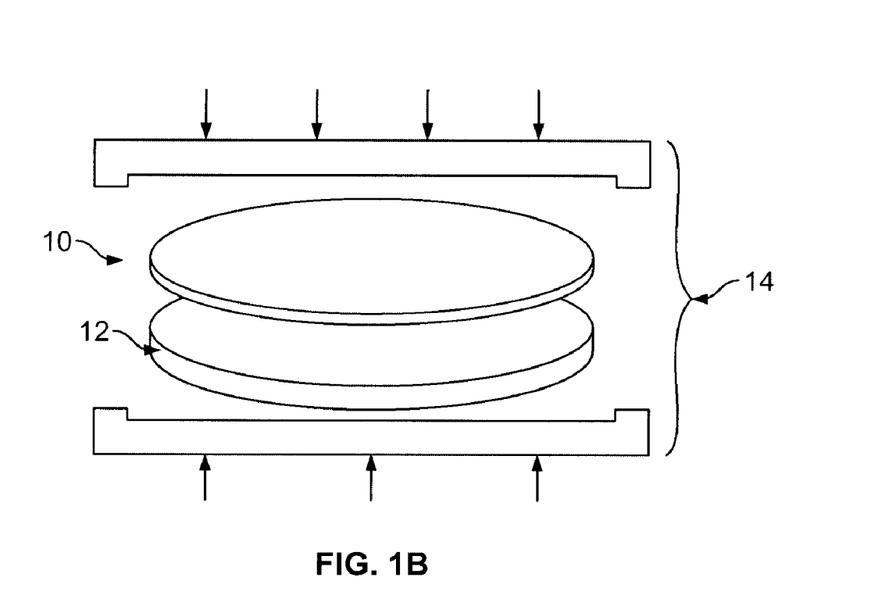
Figure 1C:
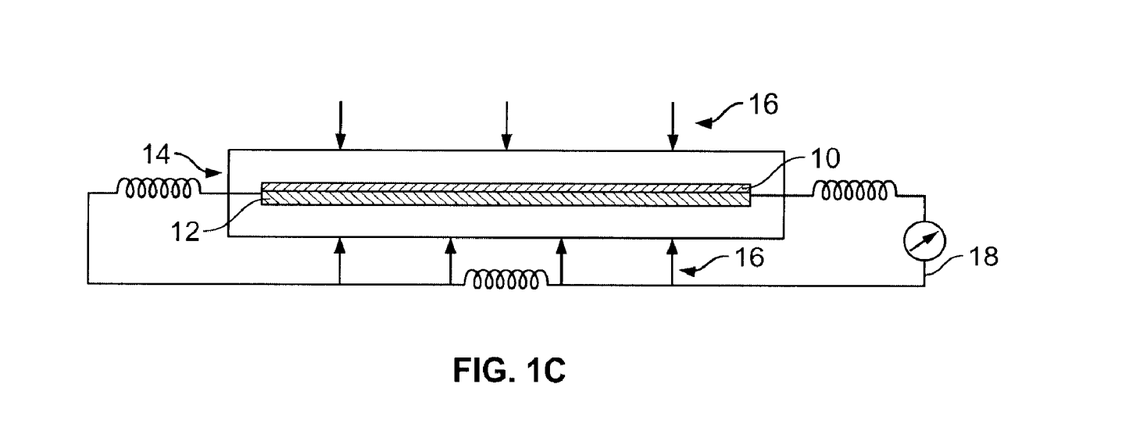

These crystals are blended in a carefully controlled distribution of particle size, and placed with a presintered tungsten carbide substrate generally designated 12 into a refractory container called a cell generally designated 14. Additional engineered materials may be placed into the cell 14 to transmit the tremendous pressure (up to 1 million PSI) schematically shown as 16 required to help fuse the diamond crystals 10. While confined under this extremely high pressure, a current from an electrical source 18 is passed through the cell 14 containing the tungsten carbide 12 and the PDC materials 10 to create the high temperature (2000° F., for example), required. This high temperature and pressure together fully fuse the diamond crystals together to form an integral superabrasive layer 10 on the tungsten carbide substrate 12.

This superabrasive diamond disk layer 10 is typically 0.25 mm to 5 mm (0.010 to 0.20 inches) in thickness and typically has a diameter of 1 to 20 inches. It is made up of many thousands of crystals that have uniform properties in all directions, hence the term "polycrystalline" or "isotropic". The tungsten carbide disk substrate 12, has a thickness of 2 to 10 mm (0.040-0.400 inches), and is integrally bonded to and strongly supports the PDC layer 10 for the first steps in making the seal. Together, the two disks effectively become one and are referred to herein as a "composite disk". This combination of two layers is now referred to as a composite PDC disk or layer 20, and now has a thickness of about 2.25 mm to 15 mm (0.09-0.59 inches). The composite disk 20 is now suitable for subsequently being furnace brazed to a seal carrier such as the seal carrier 22 of tungsten carbide.

Figure 1D:
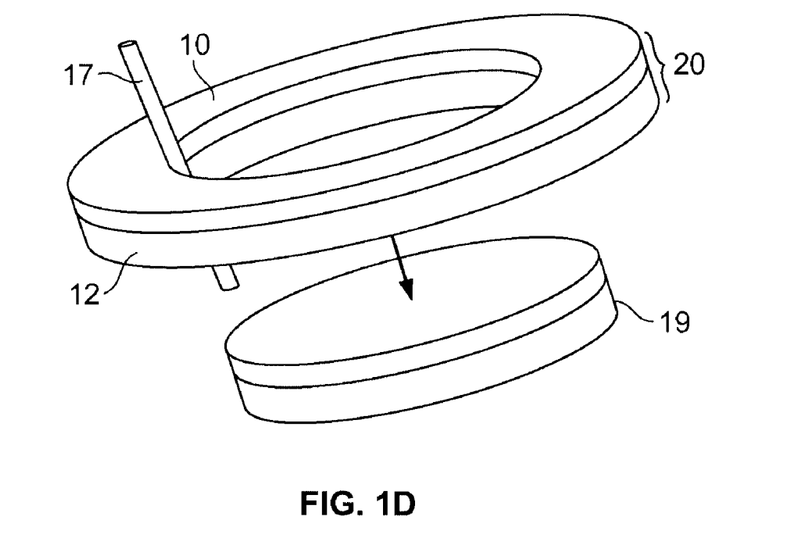

As shown in FIG. 1D, the PDC layer 10 and the tungsten carbide layer 12 start life as a flat wafer or disk, but these disks can be cut by EDM to virtually their exact final shape. The cutting instrument 17 is shown thicker, but it actually is a wire, cutting out the center portion 19 of the disk, leaving a composite ring 20, made from layers 10, 12. After being properly cut to shape, the composite PDC-tungsten carbide ring 20 is heat treated to relieve residual stresses from the EDM process and is then brazed to a secondary substrate (a seal carrier) 22 before it is lapped or polished to the required flatness specification.

Figure 1E:
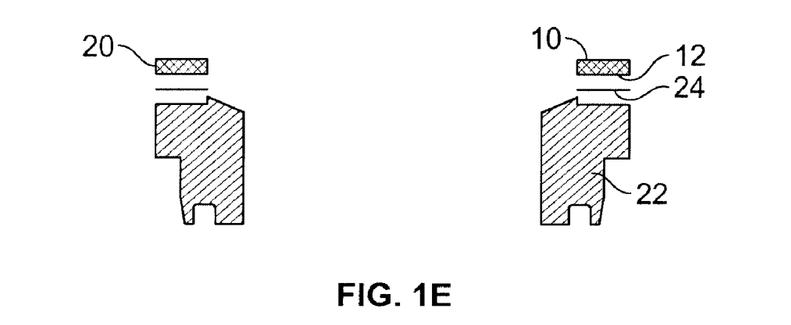
Figure 1F:
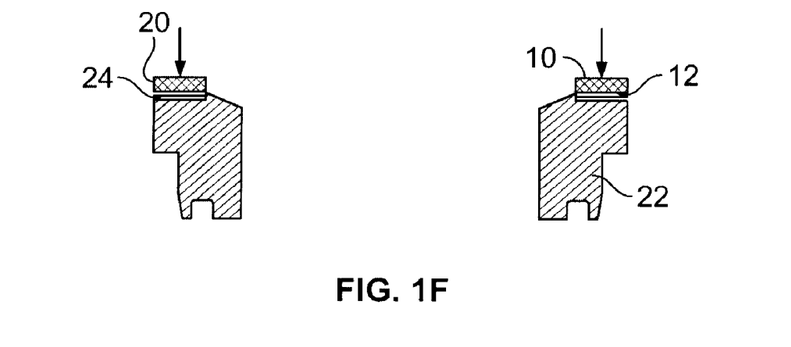
Figure 1G:
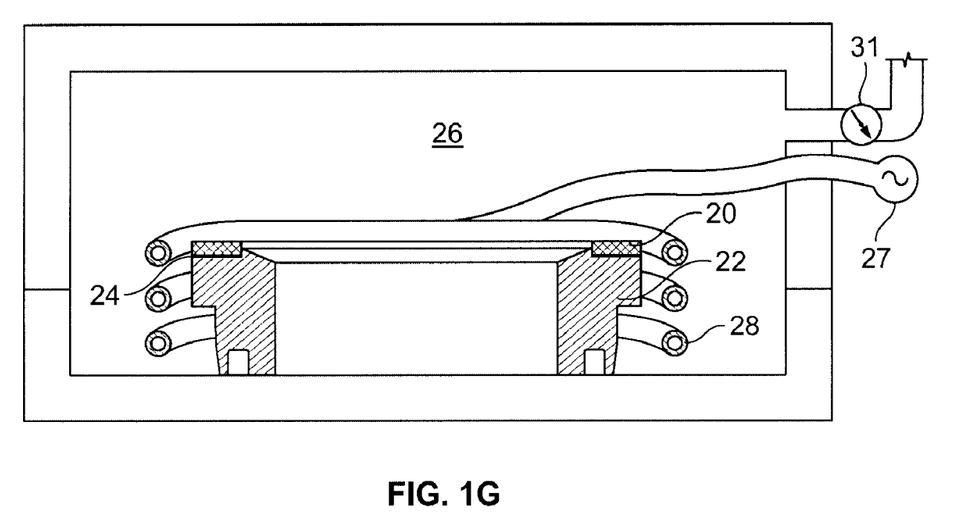

To braze the composite PDC-tungsten carbide ring 20 to the substrate or seal carrier 22 (itself preferably tungsten carbide) an extremely thin ring of a brazing material 24—50 to 100 microns in thickness, for example—is placed between the substrate or seal carrier 22 and the composite ring, 20, and then placed in a "glove box" or "chamber" generally designated 26 to be heated by an induction heater until the composite PDC-tungsten carbide ring 20 is bonded to the seal carrier 22.

The "glove box" 26 is an airtight chamber in which a protective atmosphere may be maintained—in this case an argon atmosphere. The essentials in a basic induction heating setup include a solid state RF power supply 27 which sends an AC current through a copper coil 28, and the parts to be heated 20, 22, 24 are placed inside the coil. The coil 28 serves as the transformer primary and the part to be heated becomes a short circuit secondary. When a metal part is placed within the coil and enters the magnetic field, circulating eddy currents are induced within the part. These currents flow against the electrical resistivity of the metal, generating precise and localized heat without any direct contact between the part and the coil.

The argon gas, schematically shown at 31, is pumped into the glove box 26 and serves a protectant to the parts being heated.

Heating takes place very rapidly, and the brazing material is melted rapidly but under careful control.

After this step, one or more stages of lapping the end face in a known manner are carried out, and these reduce the superabrasive finish on the PDC layer gradually, and ultimately produce a flatness of 1-3 helium light bands, which is required to hold vacuum and seal out any and all other materials. As pointed out, PDC has one of the lowest coefficients of friction of any extremely hard face material (u.0.05) making it most suitable for high speed (5,000 rpm-10,000 rpm), high pressure applications.

Having bonded the PDC tungsten carbide composite ring 20 to the seal carrier 22, a pair of carrier holders 28, 30 (FIG. 2) and the rings 20 are combined so as to make an entire seal assembly generally designated 32.

Figure 2:
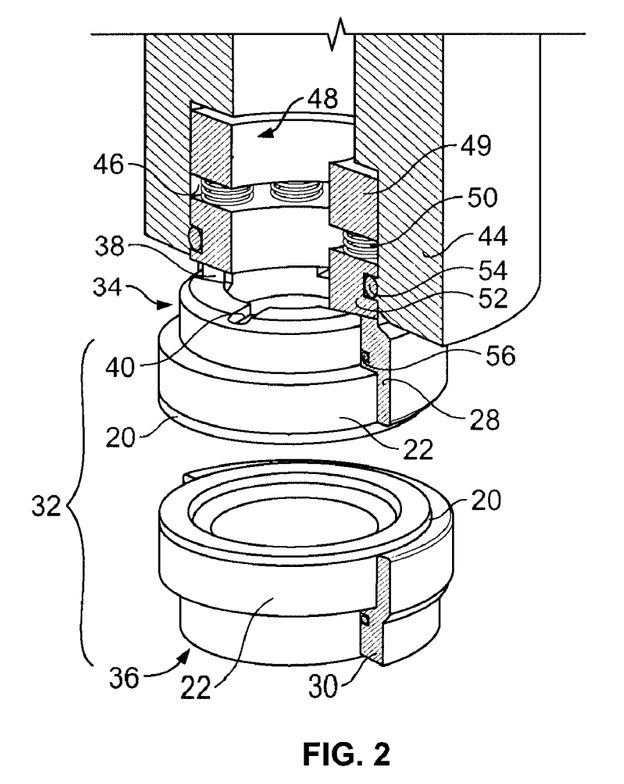
FIG. 2 is a partially exploded view of a seal of the invention showing two nearly identical seal elements and their carriers, one with a carrier holder and showing the other carrier holder with biasing means to deliver a suitable end face loading to the end faces and showing anti-rotation notches to deliver the torque needed for rotating the seal carrier.

This seal assembly is shown to include an upper portion generally designated 34 and a lower portion generally designated 36. One of these halves or components 34 is the rotatable driver and includes a number of fingers 38 for engaging the grooves 40 to transmit the rotational torque from the seal carrier holder 28 to the carrier 22 and the composite seal 20. The stationary member 36 is fixedly attached to a non-rotatable component 30.

Figure 3:
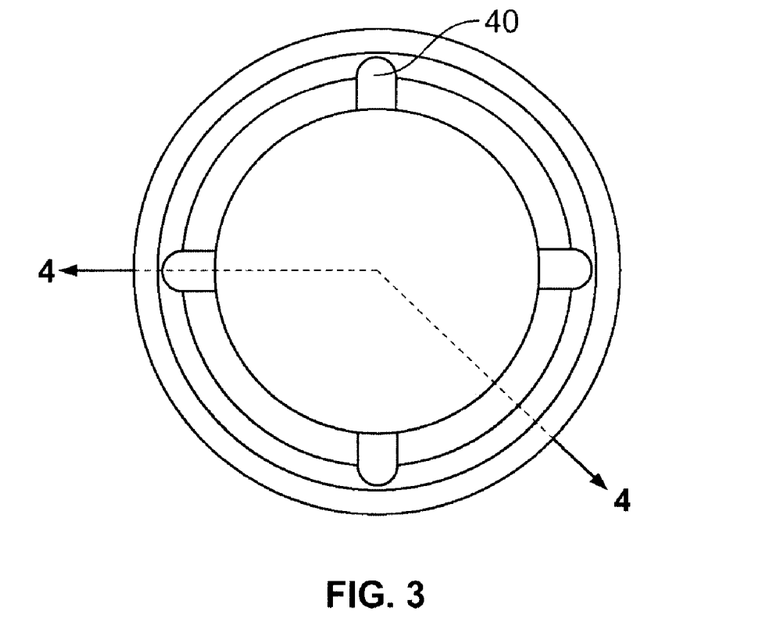
FIG. 3 is a top plan view of one of the seal carriers of the invention, showing the anti-rotation notches.
Figure 4:
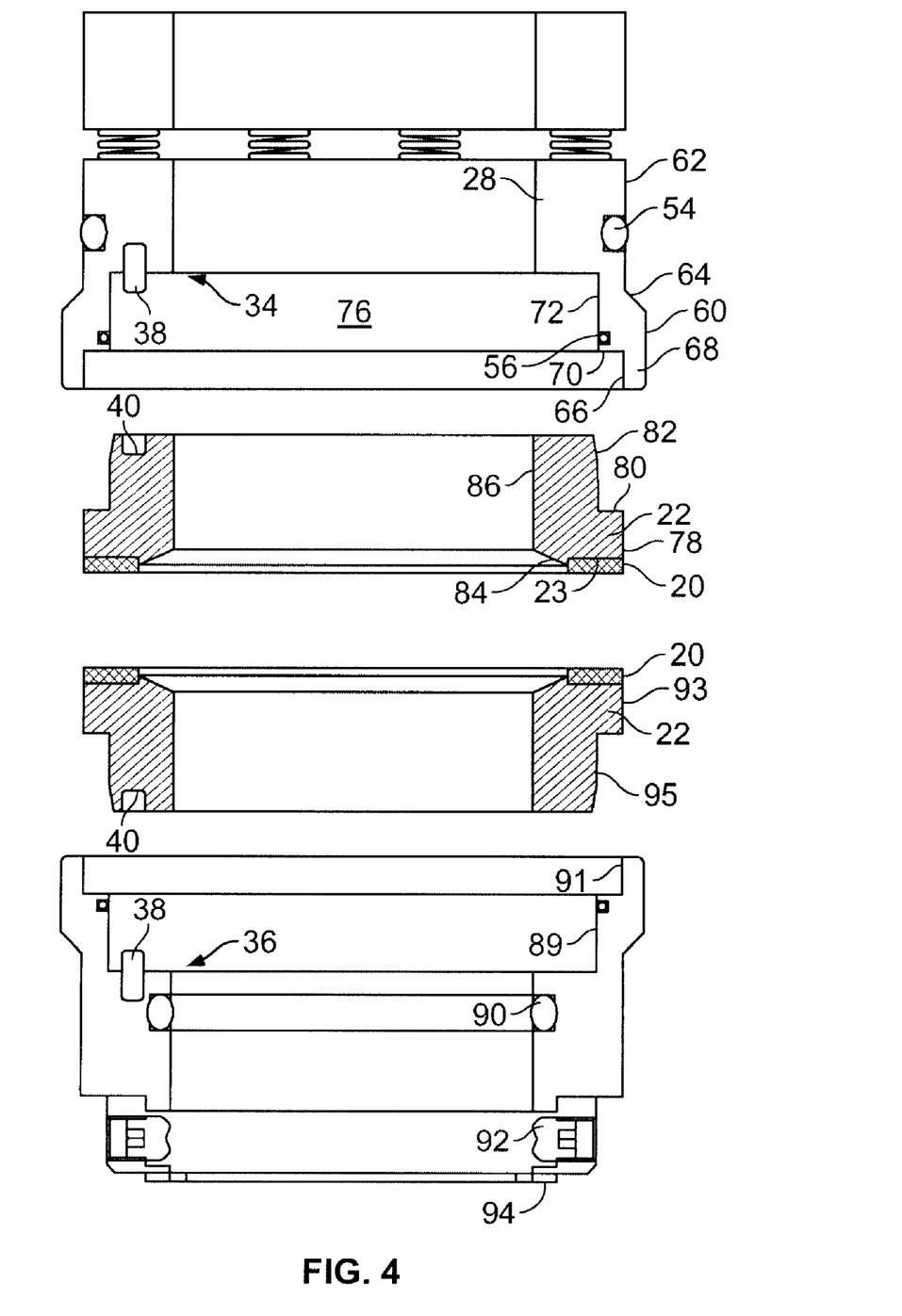
FIG. 4 is an exploded vertical sectional view showing the application of thin layers of epoxy resin to both the composite ring and the ring carrier of the invention prior to compressing the composite ring and ring carrier.
Figure 5:
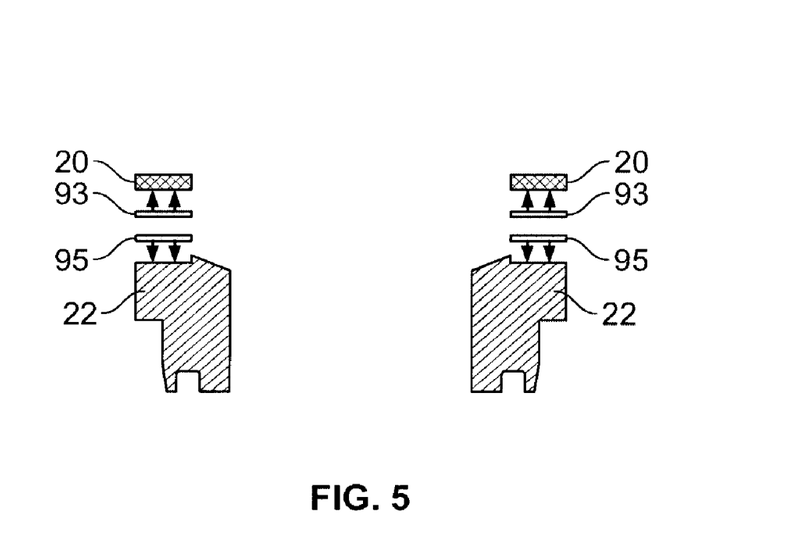

Referring now in particular to FIG. 2-4, a more detailed part of the driving scheme of the seal half of the invention is shown. Here, a chuck 44 is shown to have a counterbore 46 in its lower half which enables it to receive a series of drivers generally designated 48. These drivers 48 include an upper cylindrical member 49, shock absorbing and load applying springs 50 and lower members 52, each of which includes an O-ring seal 54. The specific component design is made to achieve 80% hydraulic balance that will provide a positive closing force of the seal faces. These units also include drive pins or fingers 38 adapted to fit into the recesses 40 shown in FIGS. 2-4. FIG. 4 shows that the upper unit also includes an outwardly facing O-ring 54 and an inwardly facing, smaller O-ring 56.

The holder 28 includes a lower outwardly directed cylindrical surface 60 which is connected to the upper outwardly directed surface 62 joined by an inclined surface 64. The outwardly directed surface 60 is combined with the inwardly directed surface 66 to define the lower portion 68 of the carrier holder 28. Radially inward of the surface 66 is a radial surface 70 and a further reduced diameter surface 72. The seal carrier 22 includes a notch 23 for the strongly bonded composite seal ring 20. The seal carrier 22 includes an outermost axial surface 78, a stepped surface 80 and a reduced diameter surface 82. In addition, there is a bevel 84 and an inwardly directed axial surface 86. The notch 23 serves as the radial seat for the composite ring 20.

Referring now to the lower portion 36, this is virtually identical to the upper portion, with the exception of an O-ring 90 which acts inwardly, and a series of static seals 92 and a spacer 94 at the bottom thereof. The various surfaces 89, 91 on the lower component 36 engage the correspondingly facing surface 93, 95 on the lower seal carrier 22.

With these components assembled as shown in FIG. 2, and the seal rings 20 only contacting each other, under an end face loading of about 80 lbs., this seal, which included the rings 20 of about a one inch diameter, was operated at a rate of 5,000-10,000 rpm for a period of 600 hours. The composite seal ring 20 kept its flatness of approximately one helium lightband. This contact was maintained with poor lubrication while sustaining a positive vacuum which was able to be maintained over an extended period of time. The seal was free from chatter under adverse conditions. The end faces 20 of this seal were maintained in intimate content with each other with an end face loading up to 80 lbs. Tests have shown that seals such as this have a life expectancy of at least 500 hours to as much as 1,000 to 1,500 hours. In some cases, the life can be as much as 45,000 hours when the system is adequately pressure balanced and an adequate lubrication film is present.

For certain other forms of seal, making a face material from PCBN was also prepared and tested. The PCBN was very similar to the PDC except that it was combined with a substrate of silicon carbide. The PCBN and the silicon carbide ceramic were similarly placed in a confined space and subjected to similar extreme temperatures and pressures. The main difference between the PDC and the PCBN was that of a slightly different chemical composition. However, the physical properties were similar enough that the components could be used somewhat interchangeably. After being subject to suitably extreme pressures and high temperatures, the resulting composite discs or rings were then adhered to the tungsten carbide, silicon carbide or silicon nitride by brazing in the same manner as that described for the PDC.

Referring now to another method of bonding the PDC composite discs to a secondary substrate made from tungsten carbide, this was achieved using a two-component epoxy type adhesive.

Once the PDC composite member 20 was prepared, instead of using a brazing material such as the brazing strip 24, the mating surfaces of the composite ring 20 and the facing surface 88 of the carrier 22 were each given a very thin coating 93, 95 of a two-component epoxy resin adhesive from the Aremco Products Company. These units were then placed in an apparatus capable of exerting a force of several hundred pounds. This force was applied and maintained for a period of at least two hours. The temperature was raised to 325 degrees Fahrenheit and the pressure was maintained. Thereafter, the bonding was complete.

For this purpose, a typical epoxy was a two component epoxy with a resin to hardener ratio of 1 to 1, and a specific gravity of 1.23. This bonding of the two parts 20, 22 had a tensile shear strength of 2,800 psi, a flexural strength of 18,000 psi and good chemical resistance. The finished product had a less than 0.01 cure shrinkage. This product was also satisfactory in performance compared to its counterpart having the furnace-brazed connection.

Certain additives can be used to improve the thermal conductivity of the epoxy adhesive layer. For example, aluminum oxide ($Al_2O_3$) or aluminum nitride can be used and placed in powdered form within the epoxy adhesive. The layer of epoxy filled with aluminum nitride or $Al_2O_3$ is kept very thin—say 100 microns. The thermal conductivity of the composite seal ring to the ring carrier can be important, since the seal faces tend to run hot, and they are inherently thermal insulators. Thus, a thermally conductive adhesive is desirable.

Another embodiment used the composite ring of PCBN adhered by brazing to a tungsten carbide substrate, in the manner described above. In still another embodiment, a silicon carbide seal carrier was bonded to the PDC composite seal ring using the epoxy resin adhesive.

From the foregoing, it will then be seen that the present invention provides a novel end face seal having a number of advantages and characteristics, including those pointed out and others which are inherent in the invention.

What is claimed is:

1. A heavy duty end face seal assembly, comprising, in combination:
    a pair of seal carrier portions having anti-rotation means thereon, whereby one of said seal carrier portions is rotatable and the other is held against rotation; and
    a pair of composite seal portions carried by said seal carrier portions, each of said composite seal portions being of a right circular cylindrical shape and each including:
    a ring-shaped support layer secured to said seal carrier, said ring-shaped support layer comprising a support layer material selected from the class consisting of tungsten carbide, silicon carbide and silicon nitride material and each having a thickness of from about 2 mm to about 10 mm, each of said ring-shaped support layer being in turn secured to one of said seal carrier portions by brazing or by an epoxy resin adhesive; and a ring-shaped contact end face layer fused to said ring-shaped support layer using temperature and pressure, wherein said ring-shaped support layer serves as a substrate, said ring-shaped contact end face layer being lapped to a finish of at least three helium light bands, said ring-shaped contact end face layer being made of an ultrahard material selected from the class consisting of polycrystalline diamond compact, polycrystalline cubic boron nitride and natural diamond monocrystalline compact material; said diamond compact material or cubic boron nitride material having a thickness of from about 0.2 mm to about 8 mm, said two ring-shaped contact end face layers being in direct sealing contact with each other;

wherein each of the composite seal portions is made by cutting out a center portion of a composite disk to thereby form the composite seal portion; and wherein the composite disk comprises a first disk of said ultrahard material that is fused to a second disk of said support layer material by placing said first and second disks in superimposed relation, compressing said superimposed disks under a force of at least 50,000 lbs and heating said superimposed disks to a temperature of at least 2,000° F., wherein the ring-shaped support layer has a circular exposed interior edge formed by cutting out said center portion of said composite disk; and wherein the ring-shaped contact end face layer has a circular exposed interior edge formed by cutting out said center portion of said composite disk.

2. A heavy duty end face seal as defined in claim 1, wherein said contact face layer is a layer of polycrystalline diamond compact or polycrystalline cubic boron nitride, said layer having an axial thickness of from about 0.25 mm to about 5 mm.

3. A heavy duty end face seal as defined in claim 1, wherein said support layer comprises tungsten carbide or silicon carbide and has an axial thickness of from about 2.5 mm to about 8 mm.

4. A heavy duty end face seal as defined in claim 1, wherein said contact end face layer has an axial thickness of 0.25 mm to about 2.5 mm and said support layer includes a tungsten carbide material having a thickness of about 2 mm to about 6 mm.

5. A heavy duty end face seal as defined in claim 1, wherein said heavy duty end face seal has an outside diameter of from about 1 to about 10 inches.

6. A heavy duty end face seal as defined in claim 1, wherein said contact end face layer is made from a fused polycrystalline diamond compact material.

7. A heavy duty end face seal as defined in claim 1, wherein said contact end face layer is made from a fused polycrystalline cubic boron nitride material.

8. A heavy duty end face seal as defined in claim 1, wherein said contact end face layer is made of a fused natural diamond monocrystalline compact material.

9. A heavy duty end face seal as defined in claim 1, wherein said support layer comprises tungsten carbide.

10. A heavy duty end face seal as defined in claim 1, wherein said support layer comprises silicon carbide.

11. A heavy duty end face seal as defined in claim 1, wherein said seal has an outside diameter of from about 1 inch to 8 inches.

12. A heavy duty end face seal as defined in claim 1, wherein said contact end face layers are made from a fused polycrystalline diamond compact having a thickness of from 25 mm to 2.5 mm, said support layers having a thickness of about 2 mm to 8 mm, and said composite seal areas are secured to said carriers by brazing in an induction heating apparatus.

13. A heavy duty end face seal as defined in claim 1, in which each of said composite seal portions are affixed to said seal carriers by an epoxy resin adhesive.

14. A heavy duty end face seal as defined in claim 13 wherein said epoxy resin adhesive includes a thermally conductive material.

15. A heavy duty end face seal as defined in claim 13 wherein said epoxy resin adhesive includes aluminum oxide, aluminum nitride or mixture a thereof to increase the thermal conductivity of said epoxy resin.

16. A heavy duty end face seal assembly as defined in claim 1, wherein the circular exposed interior edge of the ring-shaped support layer and the circular exposed interior edge of ring-shaped contact end face layer each have a circumference that is the same.

17. A heavy duty end face seal assembly as defined in claim 1, wherein each of the composite seal portions is made by cutting out the center portion of the composite disk by wire electrical discharge machinery.

* * * * *